(12) United States Patent
Thubert et al.

(10) Patent No.: US 9,258,098 B2
(45) Date of Patent: *Feb. 9, 2016

(54) EXCLUSIVE AND OVERLAPPING TRANSMISSION UNIT ALLOCATION AND USE IN A NETWORK

(71) Applicants: Pascal Thubert, La Colle sur Loup (FR); Jean-Philippe Vasseur, Saint Martin d'Uriage (FR); Patrick Wetterwald, Mouans Sartoux (FR)

(72) Inventors: Pascal Thubert, La Colle sur Loup (FR); Jean-Philippe Vasseur, Saint Martin d'Uriage (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 13/954,725

(22) Filed: Jul. 30, 2013

(65) Prior Publication Data

US 2015/0023313 A1    Jan. 22, 2015

Related U.S. Application Data

(60) Provisional application No. 61/856,700, filed on Jul. 20, 2013.

(51) Int. Cl.
*H04L 5/00*  (2006.01)
*H04W 72/04*  (2009.01)
(Continued)

(52) U.S. Cl.
CPC ............... *H04L 5/0055* (2013.01); *H04L 1/00* (2013.01); *H04L 1/18* (2013.01); *H04L 5/00* (2013.01); *H04L 5/0005* (2013.01);
(Continued)

(58) Field of Classification Search
None
See application file for complete search history.

(56) References Cited

U.S. PATENT DOCUMENTS 6,038,455 A    3/2000  Gardner et al.
8,363,662 B2   1/2013  Thubert et al.
(Continued)

FOREIGN PATENT DOCUMENTS

WO    2014/058936 A1    4/2014

OTHER PUBLICATIONS

PCT International Invitation to Pay Additional Fees and Partial International Search Report, PCT Application PCT/US2014/044454, ISA/EP, European Patent Office, Netherlands, mailed Jan. 15, 2015 (five pages).

(Continued)

*Primary Examiner* — Benjamin H Elliott, IV
(74) *Attorney, Agent, or Firm* — The Law Office of Kirk D. Williams

(57) ABSTRACT

One embodiment allocates and uses exclusive and overlapping transmission units in a network. One embodiment includes sending information, from a first network node in a network, during an exclusive transmission unit, wherein the exclusive transmission unit includes one or more wireless time slot-frequency pairings assigned to the first network node to send info nation without another assigned network transmission unit providing overlapping time slot-frequency interference from another network node communicating in the network. One embodiment includes sending information, from the first network node, during an overlapping transmission unit, wherein the overlapping transmission unit includes one or more wireless time slot-frequency pairings assigned to the first network node to send information, with the overlapping transmission unit overlapping in time slot-frequency with one or more other assigned network transmission units that will cause interference if simultaneously used.

18 Claims, 12 Drawing Sheets

(51) Int. Cl.
*H04L 1/00* (2006.01)
*H04W 72/12* (2009.01)
*H04L 1/18* (2006.01)

(52) U.S. Cl.
CPC ..... *H04W 72/0446* (2013.01); *H04W 72/0453* (2013.01); *H04W 72/121* (2013.01)

(56) References Cited

U.S. PATENT DOCUMENTS

| | | | |
|---|---|---|---|
| 8,447,849 B2 | 5/2013 | Shaffer et al. | |
| 8,451,744 B2 | 5/2013 | Vasseur | |
| 8,489,765 B2 | 7/2013 | Vasseur et al. | |
| 8,630,177 B2 | 1/2014 | Vasseur et al. | |
| 8,817,665 B2 | 8/2014 | Thubert et al. | |
| 2002/0105970 A1* | 8/2002 | Shvodian | 370/468 |
| 2002/0141435 A1* | 10/2002 | Newberg et al. | 370/442 |
| 2005/0226273 A1 | 10/2005 | Qian | |
| 2007/0248117 A1 | 10/2007 | Zuniga et al. | |
| 2008/0222478 A1 | 9/2008 | Tamaki | |
| 2009/0122778 A1* | 5/2009 | Lee et al. | 370/345 |
| 2010/0309889 A1* | 12/2010 | Mizusawa | 370/336 |
| 2012/0087336 A1 | 4/2012 | Sutivong et al. | |
| 2012/0155329 A1 | 6/2012 | Shaffer et al. | |
| 2012/0250664 A1* | 10/2012 | Li | 370/338 |
| 2012/0300668 A1 | 11/2012 | Thubert et al. | |
| 2013/0136110 A1 | 5/2013 | Yamamoto et al. | |
| 2013/0331114 A1* | 12/2013 | Gormley et al. | 455/452.1 |
| 2014/0006893 A1 | 1/2014 | Shetty et al. | |
| 2014/0133384 A1* | 5/2014 | Moulsley et al. | 370/312 |
| 2014/0233422 A1 | 8/2014 | Thubert et al. | |
| 2015/0023313 A1* | 1/2015 | Thubert et al. | 370/330 |
| 2015/0023314 A1* | 1/2015 | Thubert et al. | 370/330 |

OTHER PUBLICATIONS

Awduche et al., "RSVP-TE: Extensions to RSVP for LSP Tunnels," RFC 3209, Dec. 2001, The Internet Society, Reston, VA (sixty-one pages).

Winter et al., "RPL: IPv6 Routing Protocol for Low-Power and Lossy Networks," RFC 6550, Mar. 2012, The Internet Society, Reston, VA, USA (157 pages).

Goyal et al., "Reactive Discovery of Point-to-Point Routes in Low-Power and Lossy Networks," RFC 6997, Aug. 2013, The Internet Society, Reston, VA, USA (forty pages).

Thubert et al, "Available Routing Constructs," draft-thubert-rtgwg-arc-00, Oct. 2, 2012, The Internet Society, Reston, VA, USA (nineteen pages).

Thubert et al, "Applying Available Routing Constructs to bicasting," draft-thubert-rtgwg-arc-bicast-00, Oct. 11, 2012, The Internet Society, Reston, VA, USA (ten pages).

"Media Access Control (MAC) Bridges and Virtual Bridge Local Area Networks," IEEE Std 802.1Q™-2011, Aug. 31, 2011, IEEE Computer Society, IEEE, New York, NY (one thousand three hundred sixty-five pages).

Braden et al., "Resource ReSerVation Protocol (RSVP)—Version 1 Functional Specification," RFC 2205, Sep. 1997, The Internet Society, Reston, VA, USA (112 pages).

Le Faucheur, Resource Reservation Protocol (RSVP) Extensions for Path-Triggered RSVP Receiver Proxy, RFC 5946, Oct. 2010, The Internet Society, Reston, VA, USA (thirty-five pages).

"Part 15.4: Low-Rate Wireless Personal Area Networks (LR-WPANs) Amendment 1: MAC sublayer," IEEE Std 802.15.4e™-2012, Apr. 16, 2012, IEEE Computer Society, IEEE, New York, NY (two hundred twenty-five pages).

Vasseur et al., "Path Computation Element (PCE) Communication Protocol (PCEP)," RFC 5440, Mar. 2009, The Internet Society, Reston, VA, USA (eighty-seven pages).

Wang et al., "6tus Layer Specification," draft-wang-6tsch-6tus-01, May 23, 2013, The Internet Society, Reston, VA, USA (fifty-six pages).

Yasukawa et al., "Operations and Management (OAM) Requirements for Point-to-Multipoint MPLS Networks," RFC 4687, Sep. 2006, The Internet Society, Reston, VA, USA (fourteen pages).

Bocci et al., "A Framework for MPLS in Transport Networks," RFC 5921, Jul. 2010, The Internet Society, Reston, VA, USA (fifty-six pages).

Atlas et al., "An Architecture for IP/LDP Fast-Reroute Using Maximally Redundant Trees," draft-ietf-rtgwg-mrt-frr-architecture-03, Jul. 12, 2013, The Internet Society, Reston, VA, USA (twenty-nine pages).

Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (eight pages).

Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (six pages).

"Deterministic Ethernet, IEEE 802.1 standards for real-time process control, industrial automation, and vehicular networks," available at http://www.ieee802.org/802_tutorials/2012-11/8021-tutuorial-final-v4.pdf, Nov. 12, 2012, IEEE, New York, NY (seventy-two pages).

Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (twenty-three pages).

Farrel et al., "A Path Computation Element (PCE)-Based Architecture," RFC 4655, The Internet Society, Reston, VA (forty pages), Aug. 2006.

PCT Search Report and Written Opinion, PCT Application PCT/US2014/044454, ISA/EP, European Patent Office, Netherlands, mailed Apr. 30, 2015 (fourteen pages).

Office action, U.S. Appl. No. 13/954,846, Apr. 27, 2015, US Patent and Trademark Office, Alexandria, VA.

Amendment A, U.S. Appl. No. 13/954,846, Aug. 27, 2015, US Patent and Trademark Office, Alexandria, VA.

* cited by examiner

EXCLUSIVE AND OVERLAPPING TRANSMISSION UNIT ALLOCATION AND USE IN A NETWORK

CROSS-REFERENCE TO RELATED APPLICATIONS

This application claims the benefit of U.S. Provisional Application No. 61/856,700, filed Jul. 20, 2013, which is hereby incorporated by reference in its entirety.

TECHNICAL FIELD

The present disclosure relates generally to forwarding packets in a communications network, including, but not limited to, a wireless deterministic network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Deterministic networks rely on a set of predetermined time slots, which define at least a time (and possibly frequency to use especially in a wireless deterministic network), when each specific node can communicate a packet to a second specific node in the deterministic network.

BRIEF DESCRIPTION OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

1. Overview

Figure 1A:
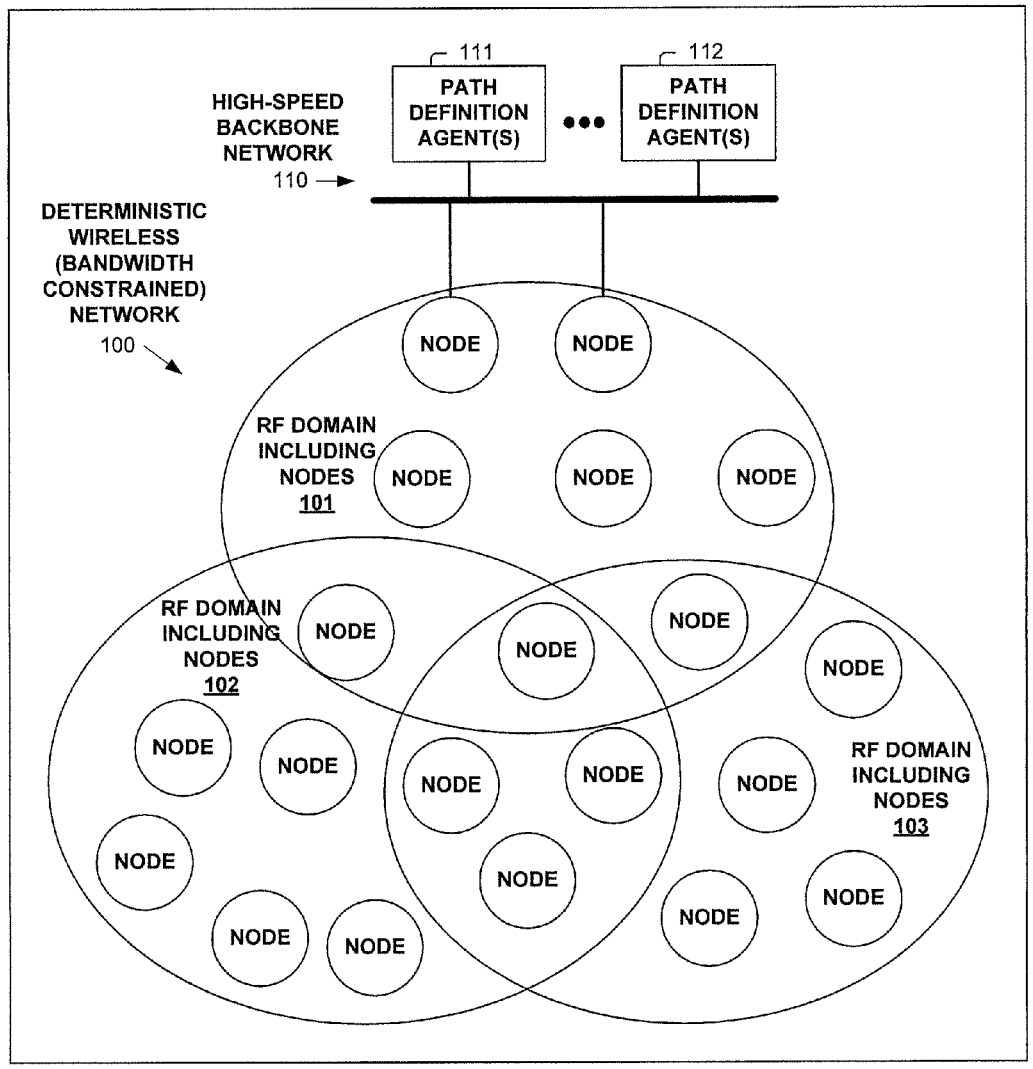
FIG. 1A illustrates a network operating according to one embodiment.

Disclosed are, inter alia, methods, apparatus, computer-storage media, mechanisms, and means associated with exclusive and overlapping transmission unit allocation and use in a network.

One embodiment includes sending information, from a first network node in a network, during an exclusive transmission unit, wherein the exclusive transmission unit includes one or more wireless time slot-frequency pairings assigned to the first network node to send information without another assigned network transmission unit providing overlapping time slot-frequency interference from another network node communicating in the network.

One embodiment includes sending information, from the first network node, during an overlapping transmission unit, wherein the overlapping transmission unit includes one or more wireless time slot-frequency pairings assigned to the first network node to send information, with the overlapping transmission unit overlapping in time slot-frequency with one or more other assigned network transmission units that will cause interference if simultaneously used.

One embodiment includes: acquiring, by a first network node in a network, assignment a particular exclusive group of a plurality of different exclusive groups, with each of the plurality of exclusive groups including a plurality of different exclusive transmission units not included in another of the plurality of exclusive groups, and with the particular exclusive group including a particular exclusive transmission unit, wherein an exclusive transmission unit being defined to include one or more wireless time slot-frequency pairings for communicating information without another network transmission unit defined during an overlapping time slot-frequency that could provide interference; and sending information, from the first network node, during the particular exclusive transmission unit.

One embodiment includes: acquiring, by a first network node in a network, assignment a particular overlapping group of a plurality of different overlapping groups, with each of the plurality of overlapping groups including a plurality of different overlapping transmission units not included in another of the plurality of overlapping groups, and with the particular overlapping group including a particular overlapping transmission unit, wherein an overlapping transmission unit being defined to include one or more wireless time slot-frequency pairings for communicating information with another network transmission unit defined during an overlapping time slot-frequency that will provide interference if simultaneously used; and sending information, from the first network node, during the particular overlapping transmission unit.

2. Description

Disclosed are, inter alia, methods, apparatus, computer-storage media, mechanisms, and means associated with exclusive and overlapping transmission unit allocation and use in a network, and/or reassignment of unused portions of a transmission unit in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a "transmission unit" refers an elementary communications entity including a time slot. In the context of a wireless network, a transmission unit includes a time slot-frequency pairing, as the information is not only transmitted within a time slot, but also at a frequency (e.g., channel). In one embodiment, a transmission unit may include multiple time slots or multiple time slot-frequency pairings, such as when one or more retransmission time slots or time slot-frequency pairing are included, or the length of transmitted information (e.g., a packet size) exceeds the amount of information that can be transmitted in a single time slot or time slot-frequency pairing.

One embodiment dynamically allocates more time slot-frequency pairings, in a best effort fashion based on actual best effort queues (e.g., for statistically multiplexed traffic). In one embodiment, nodes schedule collision-free communication with other nodes when there pre-allocated time slot-frequency pairings are not needed to communicate packet traffic. One embodiment uses a first, lightweight approach by picking a new soft cell randomly in the schedule, and relying on the monitoring process to move that in the schedule. One embodiment uses a second, potentially more efficient by heavier approach that has each node announce its schedule periodically, and use that information during negotiation.

In one embodiment, time slot-frequency pairings are pre-allocated as a chain, in such a fashion that a node will signal dynamically whether it needs some of the subsequent slots in a round of the slot frame. In one embodiment, a three-way method for assigning time slots on the fly for constant bit rate and variable bit rate traffic in a deterministic environment based on chaining time slot-frequency pairings within non or partially overlapping transmission units depending on usage. A sender node decides not to use subsequent time slot-frequency pairing when there is no packet in queue. This way the listener does not need to wake up on such time slot-frequency pairings and there is no energy wasted in idle listening. One embodiment uses a different version of the three-way exchange whereby the third frame indicates whether a subsequent slot in a chain of time slots will be used. This "more" indicator can in fact be an information element inside the ACK-ACK (discussed infra).

In a classical Automatic Repeat ReQuest (ARQ) (e.g., frame and acknowledgement) mechanism, if the acknowledgment (ACK) from B to A is lost then the frame from A to B will be resent even though B received it, because A failed to receive a positive acknowledgement and thus believes that the frame was lost. In other words, the two cases of a lost frame or lost acknowledgement cannot be distinguished.

When using time division multiplexing in a lossy environment such as 6TSCH over LLN, there must be room as part of any schedule to accommodate loss and re-transmissions. For instance when on the average it takes three transmissions for one successful one, there are in fact two time slot-frequency pairings that are dedicated for re-transmission for each time slot-frequency pairing that is dedicated to a new transmission. The question is whether B should listen to those additional time slot-frequency pairings when it received the packet successfully in the first time slot-frequency pairing.

If B, to save energy, shuts its receiver on the next transmit opportunity that was meant for re-transmission because A did not receive the ACK, then A may retry multiple times with no apparent success. On the other hand, if B wakes up and listens, then it might be wasting energy if A indeed received the ACK.

One embodiment uses an ACK-ACK mechanism to acknowledge the ACK that reduces idle listens or un-listened transmits based on a three-way exchange (e.g., data frame, ACK, ACK-ACK).

One embodiment introduces a mechanism to allocate dynamically a number of time slot-frequency pairings in a slot frame between a distributed allocating node and a set of clients, that leverages this three-way exchange.

The ACK-ACK A→B acknowledges the ACK-ACK B→A for a data frame A→B. If the ACK-ACK is not received, the ACK is resent at the next transmission opportunity B→A. This way, the original frame does not have to be resent.

The ACK-ACK allows a device to make sure that its ACK was received, so it does not need to start its receiver just for the chance of re-transmission due to ACK getting lost.

One embodiment builds on the notion of allocated chains of time slot-frequency pairings to allow dynamic allocation and reallocation based on a protocol that is carried within the multi-way (e.g., three) exchange. In one embodiment, the slot frame (e.g., Superframe) is logically split in two types of zones: exclusive/deterministic (e.g., for Constant Bit Rate traffic) and the overlapping/best effort (e.g., for Variable Bit rate traffic). These zones may be interleaved in any fashion for instance to ensure there is no large gap between two adjacent deterministic time slot-frequency pairings. A given flow may later be mapped to time slot-frequency pairings in both parts, for a committed and an excess burst rates, respectively.

One embodiment allocates groups of one or more transmission units. One embodiment aggregates multiple transmission units into a group for assignment and use by an acquiring owner.

In one embodiment, an IPv6 Routing Protocol for Low-Power and Lossy Networks ("RPL") parent typically manages the transmission units for its children, and plays the role of allocating node when the children are clients.

In one embodiment, an allocating node auto configures (selects for itself) a number of groups of transmission units (including corresponding needed exclusive and/or overlapping transmission units) depending on the perceived needs, by selecting groups that are not yet auto-configured by any neighbor, and then advertises the codes in beacons (e.g., in a new IE in 802.15.4e EB, or a RPL DIO). This limits the chances of interferences when a node manages transmission units locally.

One embodiment adds a way for the child to ask for exclusive and/or overlapping transmission units in the data frame (for upwards traffic) or in the ACK (for downwards traffic) and the parent to answer in the ACK or the ACK-ACK respectively, such as, but not limited to, in an information element (IE). The request may be permanent if it is to be replayed at every slot frame until explicit cancellation, or transient if the transmission units are needed only for the particular slot frame iteration.

In one embodiment, transmission units are allocated by the owner (e.g., parent) by amounts of prime numbers (or just associated with a prime number used for identification, rather than an actual number of transmission units), like 3, 5, 7 etc., and only once per prime number per slave (e.g., child). This way, the slave can indicate with the product of the prime numbers which of the allocated transmission units it is using. So, if, for instance, the slave indicates a product of twenty-one, and the owner thinks it has allocated a set of three slots, a set of five slots and a set of seven slots, this means that the allocation of five was either not received or will not be used anymore, leaving the allocator free to attribute that particular set of five slots to this (again) or to another slave, based on further demands.

For example in one embodiment, an IE in the data frame indicates that the slave node B requires a ten slots from the owner, for permanent exclusive deterministic use. In that zone, the slave has a product of twenty-one meaning that it has a block of seven and a block of three slots totaling ten transmission units already allocated. In one embodiment, the owner allocates the nearest higher number of transmission units, eleven, because that number was not already allocated to that node. The parent returns the enumeration of transmission units in an IE in the ACK frame. Note that, in one embodiment, local policy may be used to enforce specific behaviors (e.g., an owner may limit the maximum number of transmission units according to the nature of the slave, types of traffic received from that node, detection of misbehaving node, etc.).

In one embodiment, an IE in the ACK-ACK frame, the slave acknowledges that it will use the extra transmission units by returning a product of 165, meaning that it knows and will use a list of three, a list of five, and a list of eleven slots. If this is not received, then anytime later when the slave sends its product of 165, the parent will be able to figure that the allocation of eleven was indeed received and is being used.

Inside this particular round (a slot frame) the allocating (owner) node A that manages the transmission units may re-attribute transmission units that are attributed to a chain of time slot-frequency parings for another node if that other node does not use all the time slot-frequency parings in the current slot frame. Time slot-frequency pairings in the best effort zones may be free and waiting for attribution at each round; the owner (e.g., parent) may use history of recent attribution to guarantee a fair share between its slaves (e.g., children).

In one embodiment, D does not need its allocation of transmission units for the current round. In the ACK-ACK "more" bit; it indicates so to A. A is this free to reallocate these transmission units for the particular iteration of the slot frame.

In one embodiment, D requires additional temporary transmission units. These can be implemented with D's unused slots unless D's slots are best effort (e.g., in the overlapping zone) and B wants deterministic guarantees (e.g., transmission units in the exclusive zone) and in particular lesser chances of collision that the overlapping zone does not guarantee. In this can, say that D's slots are deterministic (e.g., in the exclusive zone).

In one embodiment, the transmission units allocated by the parent in the overlapping zone for the particular round are taken randomly and distributed in the overlapping zone corresponding to the transmission unit that the parent picked. There is still a chance that the transmission unit chosen will collide with a selection by another parent for its own transmission unit. In one embodiment to resolve the collision, the random transmission unit selection plays the role of CSMA but with no exponential back off. In one embodiment, the overlapping zone is expected large so exponential back off is not needed. Instead, the operation works like a slotted aloha in a largely unused space.

One embodiment includes a method, comprising: sending information, from a first network node in a network, during an exclusive transmission unit, wherein the exclusive transmission unit includes one or more wireless time slot-frequency pairings assigned to the first network node to send information without another assigned network transmission unit providing overlapping time slot-frequency interference from another network node communicating in the network. One embodiment includes a method comprising: sending information, from the first network node, during an overlapping transmission unit, wherein the overlapping transmission unit includes one or more wireless time slot-frequency pairings assigned to the first network node to send information, with the overlapping transmission unit overlapping in time slot-frequency with one or more other assigned network transmission units that will cause interference if simultaneously used.

In one embodiment, the network is associated with a plurality of exclusive groups of exclusive transmission units, with each of the plurality of exclusive groups of exclusive transmission units including a plurality of different exclusive transmission units not included in another of the plurality of exclusive groups of exclusive transmission units, with a particular exclusive group of the plurality of exclusive groups including the exclusive transmission unit; and wherein the network is associated with a plurality of overlapping groups of overlapping transmission units, with each of the plurality of overlapping groups of overlapping transmission units including a plurality of different overlapping transmission units not included in another of the plurality of overlapping groups of overlapping transmission units, with a particular overlapping group of the plurality of exclusive groups including the overlapping transmission unit.

One embodiment includes: acquiring, by the first network node, ownership of the particular exclusive group and the particular overlapping group. In one embodiment, the first network node is a child of a parent network node in the network; and wherein the first network node acquires the assignment of the particular exclusive group and the particular overlapping group from the parent network node. In one embodiment, the plurality of exclusive groups and the plurality of overlapping groups are initially defined by one or more path definition agents. One embodiment includes: communicating, by the first network node to the parent network node, one or more request messages requesting an assignment of one or more exclusive transmission units and one or more overlapping transmission units; and wherein said acquisition of the assignment of the particular exclusive group and the particular overlapping group from the parent network node is in response to at least one of said one or more request messages. One embodiment includes network publishing, by the parent network node, ownership of the exclusive transmission unit and the overlapping transmission unit.

In one embodiment, the first network node acquires the assignment of the particular exclusive group and the particular overlapping group from one or more path definition agents associated with the network. One embodiment include: network publishing, by the first node, ownership of the exclusive transmission unit and the overlapping transmission unit. One embodiment includes: acquiring, by the first network node, ownership of the exclusive transmission unit and the overlapping transmission unit from a parent network node or a path definition agent.

One embodiment includes a method, comprising: acquiring, by a first network node in a network, assignment a particular exclusive group of a plurality of different exclusive groups, with each of the plurality of exclusive groups including a plurality of different exclusive transmission units not included in another of the plurality of exclusive groups, and with the particular exclusive group including a particular exclusive transmission unit, wherein an exclusive transmission unit being defined to include one or more wireless time slot-frequency pairings for communicating information without another network transmission unit defined during an overlapping time slot-frequency that could provide interference; and sending information, from the first network node, during the particular exclusive transmission unit.

One embodiment includes: network publishing, by the first network node, assignment of the particular exclusive group to the first network node. In one embodiment, the first network node is a parent network node of one or more child nodes in the network. In one embodiment, the first network node is a child of a parent network node in the network; and wherein the first network node acquires said assignment of the particular exclusive group from the parent network node. In one embodiment, each of the plurality of plurality of different exclusive groups is associated with a different prime number; wherein the first node, prior to said acquiring assignment of the a particular exclusive group, acquired a currently used plurality of the plurality of different exclusive groups not including the particular exclusive group; and wherein said acquiring of said assignment of the particular exclusive group includes sending a confirmation by the first network node to the parent network node, with said confirmation including a product of the prime numbers associated with each of the currently used plurality of the plurality of different exclusive groups and the particular exclusive group. One embodiment includes: network publishing, by the parent network node, assignment of the particular exclusive group to the parent network node.

One embodiment includes: communicating, by the first network node to the parent network node, a request message requesting an assignment of one or more exclusive transmission units; and wherein said acquisition of the assignment of the particular exclusive group is in response to the request message. In one embodiment, the particular exclusive transmission unit comprises a particular time slot-frequency pairing including a frame time for sending from the first network node to the parent network node, an acknowledgement time for sending from the parent network node to the first network node, and an acknowledgment of the acknowledgment time for sending from the first network node to the parent network node; and wherein the frame time includes the request message, the acknowledgement time includes the assignment of the particular exclusive group to the first network node, and the acknowledgment of the acknowledgment time includes a confirmation that the first network node has acquired the particular exclusive transmission unit.

One embodiment includes a method, comprising: acquiring, by a first network node in a network, assignment a particular overlapping group of a plurality of different overlapping groups, with each of the plurality of overlapping groups including a plurality of different overlapping transmission units not included in another of the plurality of overlapping groups, and with the particular overlapping group including a particular overlapping transmission unit, wherein an overlapping transmission unit being defined to include one or more wireless time slot-frequency pairings for communicating information with another network transmission unit defined during an overlapping time slot-frequency that will provide interference if simultaneously used; and sending information, from the first network node, during the particular overlapping transmission unit.

In one embodiment, the first network node is a child of a parent network node in the network; and wherein the first network node acquires said assignment of the particular overlapping group from the parent network node; and wherein the method includes: communicating, by the first network node to the parent network node, a request message requesting an assignment of one or more overlapping transmission units; and wherein said acquisition of the assignment of the particular overlapping group is in response to the request message. In one embodiment, the particular overlapping transmission unit comprises a particular time slot-frequency pairing including a frame time for sending from the first network node to the parent network node, an acknowledgement time for sending from the parent network node to the first network node, and an acknowledgment of the acknowledgment time for sending from the first network node to the parent network node; and wherein the frame time includes the request message, the acknowledgement time includes the assignment of the particular overlapping group to the first network node, and the acknowledgment of the acknowledgment time includes a confirmation that the first network node has acquired the particular overlapping transmission unit.

One embodiment includes a method, comprising: signaling, by a first network node in a network to a transmission unit owner node, identifying one or more remaining wireless time slot-frequency pairings of a current transmission unit assigned to the first network node that will not be used by the first network node during the current transmission unit, wherein a transmission unit includes a plurality of wireless time slot-frequency pairings for transmitting information; and reassigning, by the transmission unit owner node, said one or more remaining wireless time slot-frequency pairings to a second network node in the network to use during the current transmission unit.

In one embodiment, wherein the first network node and second network node are children network nodes of the transmission unit owner node. One embodiment includes: requesting, by the second network node from the transmission unit owner node, additional wireless time slot-frequency pairings. In one embodiment, the second network node communicates with said transmission unit owner node in a particular time slot-frequency pairing including a particular frame time for sending from the second network node to the transmission unit owner node, a particular acknowledgement time for sending from the transmission unit owner node to the second network node, and a particular acknowledgment of the acknowledgment time for sending from the second network node to the transmission unit owner node.

In one embodiment, the particular frame time includes said request by the second network node for additional wireless time slot-frequency pairings. In one embodiment, the particular acknowledgement time includes said reassignment of said one or more remaining wireless time slot-frequency pairings of the current transmission unit. In one embodiment, the particular acknowledgment of the acknowledgment time includes a confirmation signal from the second network node to the transmission unit owner node that the second network node will use at least one of said one or more remaining wireless time slot-frequency pairings. In one embodiment, the second network node uses said at least one of said one or more remaining wireless time slot-frequency pairings to communicate with the transmission unit owner node. In one embodiment, the particular acknowledgement time includes said reassignment of said one or more remaining wireless time slot-frequency pairings of the current transmission unit.

In one embodiment, the second network node communicates with said transmission unit owner node in a particular time slot-frequency pairing including a particular frame time for sending from the second network node to the transmission unit owner node, a particular acknowledgement time for sending from the transmission unit owner node to the second network node, and a particular acknowledgment of the acknowledgment time for sending from the second network node to the transmission unit owner node; and wherein the particular acknowledgement time includes said reassignment of said one or more remaining wireless time slot-frequency pairings of the current transmission unit. In one embodiment, the second network node uses said at least one of said one or more remaining wireless time slot-frequency pairings to communicate with the transmission unit owner node. In one embodiment, the first network node communicates said signal that one or more remaining wireless time slot-frequency pairings of a current transmission unit assigned to the first network node that will not be used by the first network node during the current transmission unit in an acknowledgment of the acknowledgment time of a time slot-frequency pairing.

One embodiment includes a method, comprising: communicating information between a first network node and a second network node using a particular time slot-frequency pairing, including a particular frame time for sending from the second network node to the first network node, a particular acknowledgement time for sending from the first network node to the second network node, and a particular acknowledgment of the acknowledgment time for sending from the second network node to the first network node.

In one embodiment, said communicating information includes sending, by the second network node in the particular acknowledgement time, a signal reassigning one or more additional wireless time slot-frequency pairings of a particular transmission unit for use by the first network node; wherein the particular transmission unit includes a first time slot-frequency pairing and subsequently said one or more additional wireless time slot-frequency pairings. One embodiment includes: signaling, by a third network node to the second network node in the first time slot-frequency pairing, that the third network node will not use said one or more additional wireless time slot-frequency pairings. In one embodiment, the third network node communicates the signal that the third network node will not use said one or more additional wireless time slot-frequency pairings in an acknowledgment of the acknowledgment time of a time slot-frequency pairing.

One embodiment includes a method, comprising: receiving, by a transmission unit owner node, a signal identifying one or more remaining wireless time slot-frequency pairings of a current transmission unit assigned to a first network node that will not be used by the first network node during the current transmission unit, wherein a transmission unit includes a plurality of wireless time slot-frequency pairings for transmitting information; and reassigning, by the transmission unit owner node, said one or more remaining wireless time slot-frequency pairings for use by a second network node in the network during the current transmission unit.

One embodiment includes: receiving, receiving, by the transmission unit owner node, information from the second network node during at least one of said one or more remaining wireless time slot-frequency pairings during the current transmission unit. In one embodiment, the second network node communicates with said transmission unit owner node in a particular time slot-frequency pairing including a particular frame time for sending from the second network node to the transmission unit owner node, a particular acknowledgement time for sending from the transmission unit owner node to the second network node, and a particular acknowledgment of the acknowledgment time for sending from the second network node to the transmission unit owner node; and wherein the method includes sending, by the transmission unit owner node, in said particular acknowledgement time said reassignment of said one or more remaining wireless time slot-frequency pairings of the current transmission unit. In one embodiment, the second network node communicates with said transmission unit owner node in a particular time slot-frequency pairing including a particular frame time for sending from the second network node to the transmission unit owner node, a particular acknowledgement time for sending from the transmission unit owner node to the second network node, and a particular acknowledgment of the acknowledgment time for sending from the second network node to the transmission unit owner node; and wherein the method includes sending, by the transmission unit owner node, in said particular acknowledgement time said reassignment of said one or more remaining wireless time slot-frequency pairings of the current transmission unit.

Expressly, turning to the figures, FIG. 1A illustrates a network 100 (e.g., deterministic wireless network, which is bandwidth constrained) operating according to one embodiment. As shown, network 100 includes a high-speed (e.g., Ethernet) backbone network including one or more path definition agents 111-112. Deterministic wireless network 100 includes three overlapping different radio frequency (RF) domains 101, 102 and 103, each containing a plurality of nodes as shown in FIG. 1A. Note, typically and not shown, each of these network nodes (e.g., when a node operates as a bridge or router) is connected to a network of devices and/or directly connected to one or more devices. One embodiment uses more or less RF domains and/or nodes.

Figure 1B:
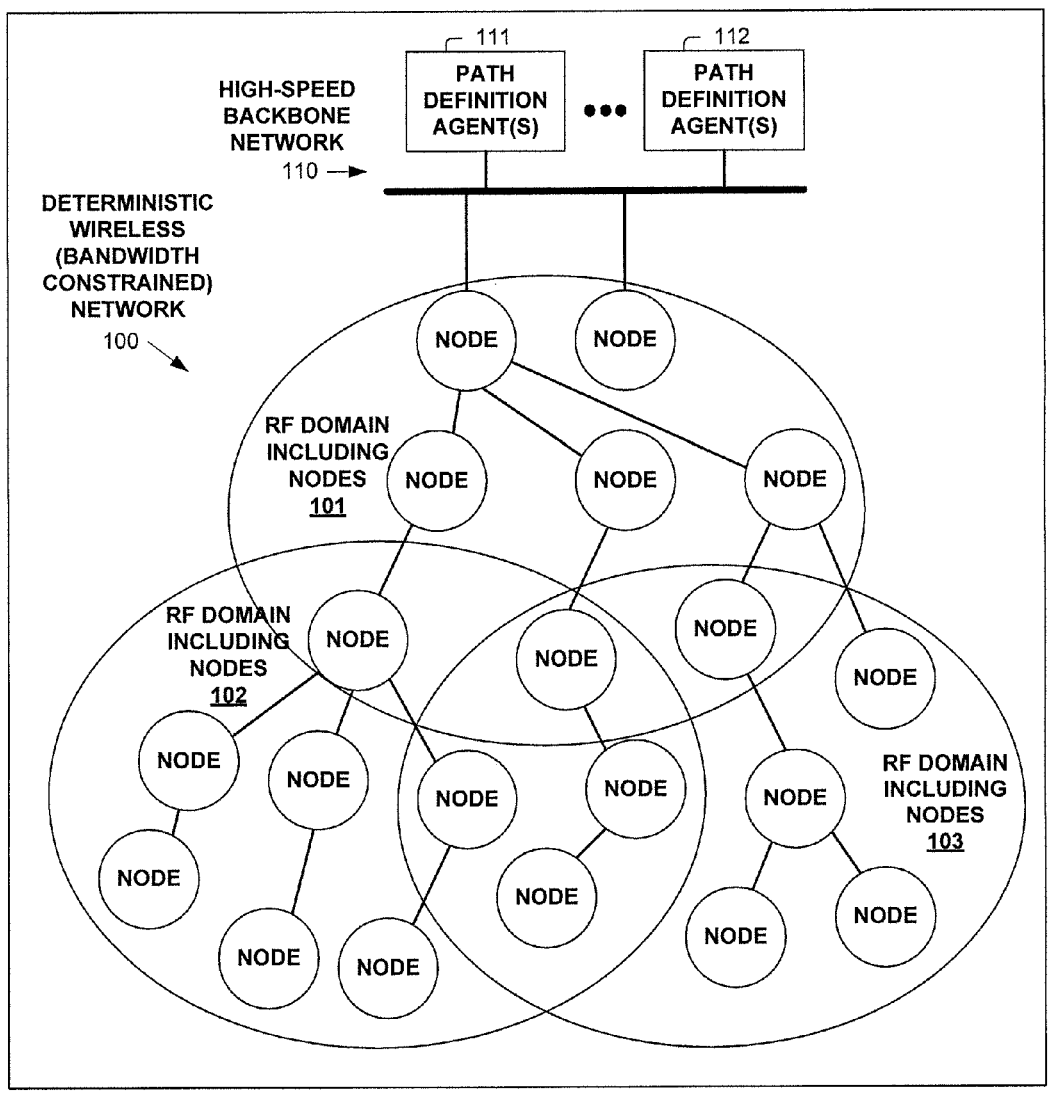
FIG. 1B illustrates a network operating according to one embodiment.

FIG. 1B illustrates the communication links established between nodes in RF domains 101, 102 and 103 to provide access to one or more path definition agents 111-112. In one embodiment, a communications path for transmitting packets between first and second nodes may traverse any set of nodes, and is not limited to one or more of the paths shown in FIG. 1B.

Figure 1C:
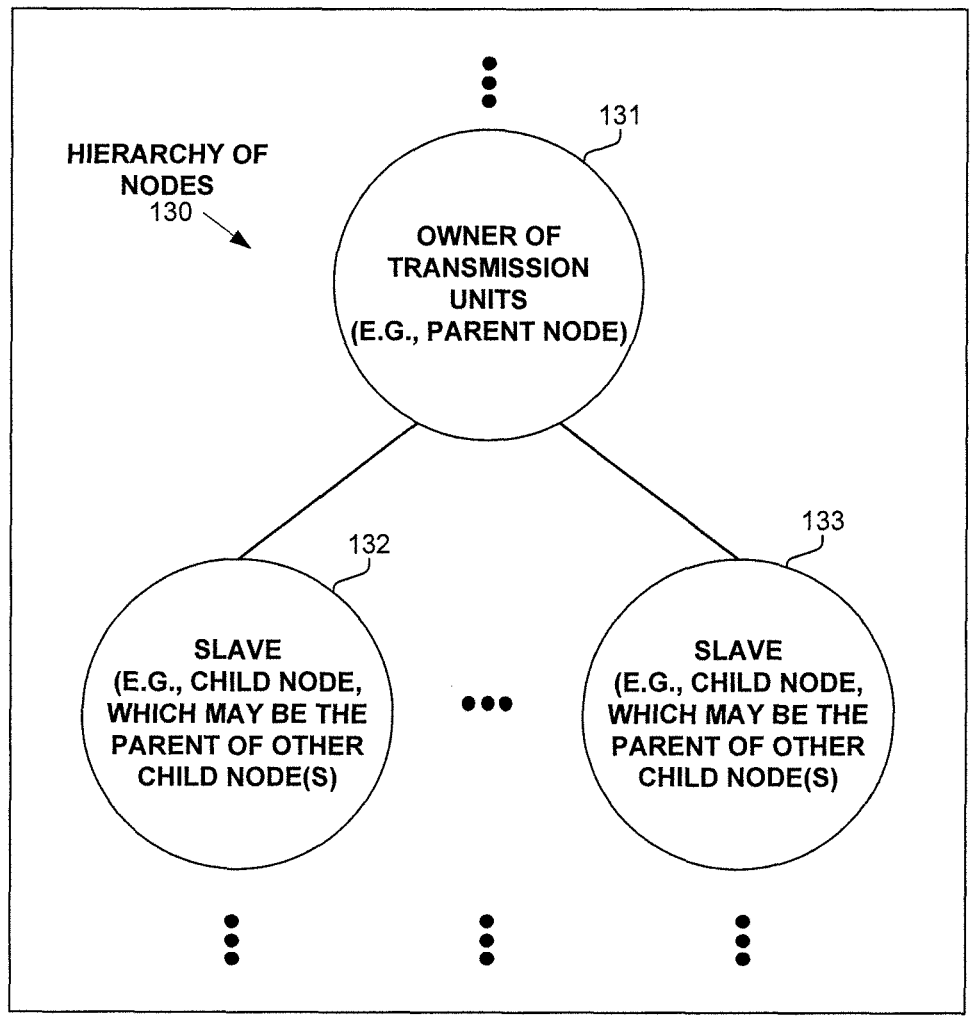
FIG. 1C illustrates a hierarchy of nodes operating according to one embodiment.

FIG. 1C illustrates a hierarchy of nodes 130 used in one embodiment. For example, one embodiment uses IPv6 Routing Protocol for Low-Power and Lossy Networks ("RPL"), such as that described in RFC 6550 in the organization of nodes. As shown, an owner node 131 owns transmission units for communicating with its slave nodes 132-133. In one embodiment, owner node 131 represents a parent node and slave nodes 132-133 represent children nodes of parent node 131. In one embodiment, slave (children) nodes 132-133 are parent nodes of other nodes (not shown). This hierarchy of nodes is used in one embodiment for central assignment (e.g., by one or more path definition agents) or distributed assignment by owner nodes 131 of transmission units to nodes within a network.

Figure 2A:
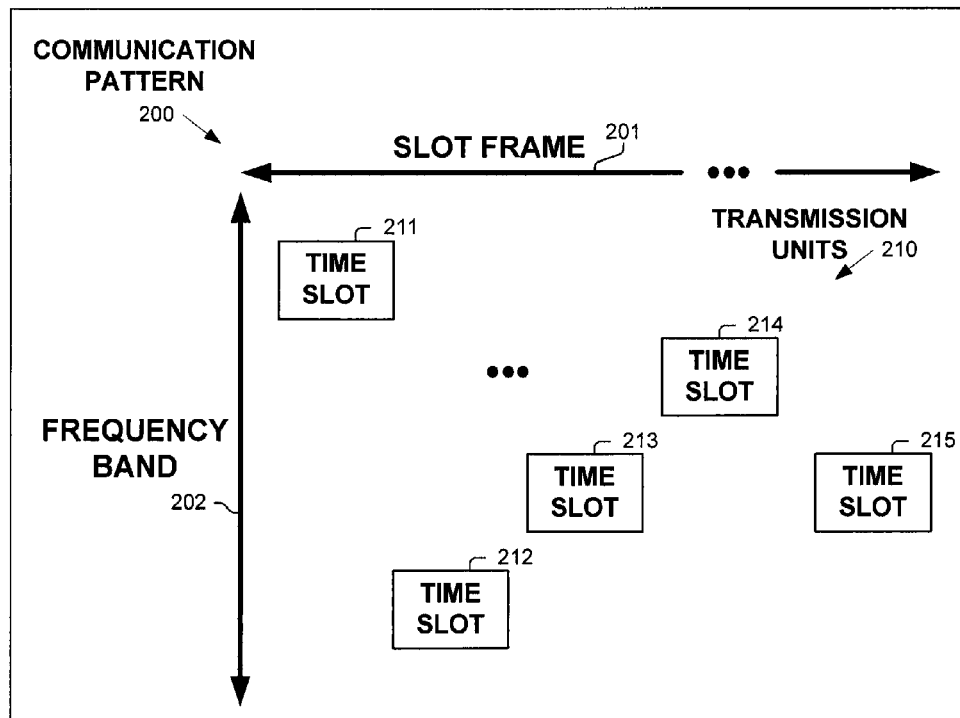
FIG. 2A illustrates a communication pattern operating according to one embodiment.

Referring to FIG. 2A, in one embodiment in a deterministic network, a node communicates information (e.g., a packet) to a second node in a time slot (211-215) as illustrated by communication pattern 200. A slot frame 201 (e.g., a Superframe when repeated typically with channel rotation) is a period of time divided into multiple time slots. Also, in a wireless (or fiber) there is a second dimension, that the frequency (202) used for a particular time slot (211-215). Thus, in one embodiment, a time slot (211-215) is associated with a particular time (e.g., of a slot frame 201) and a particular frequency (e.g. of a frequency band 202).

In one embodiment, a Superframe is established by one or more path definition agents that defines a matrix of n time slots by m frequencies (e.g., channels). One or more of these n-m paring is referred to herein as a transmission unit.

In one embodiment, such as a wireless deterministic network, a transmission unit 210 includes multiple time slot-frequency pairings grouped to provide a deterministic ability to retransmit a lost packet, or to deterministically carry more information than can be transmitted in a single time slot-frequency pairing (e.g., a packet size exceeds that which can be transmitted in a single transmission unit). For example, in one embodiment, a transmission unit refers to one or more time slot-frequency pairings. In one embodiment, a transmission unit refers three time slot-frequency pairings: an initial time slot-frequency pairing and two time slot-frequency pairings for retransmission when needed. In one embodiment, when these additional time slot-frequency pairings are not required for retransmission or to send additional information, they can be used for other communication (e.g., between the transmission unit owner and another node).

Figure 2B:
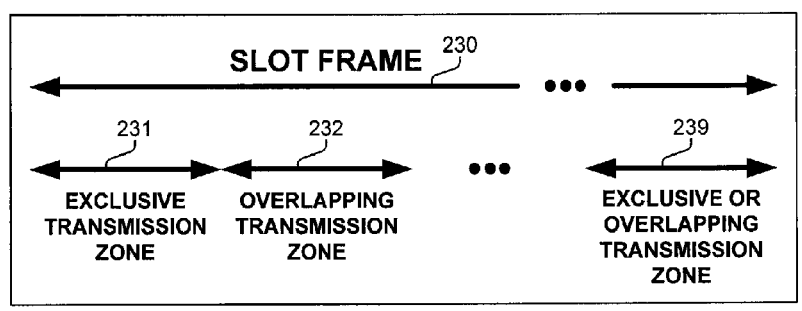
FIG. 2B illustrates a division of a slot frame partitioned into zones of exclusive and overlapping transmission units.

FIG. 2B illustrates the partitioning in time of a slot frame 230 into multiple transmission zones 231-239, with some allocated to exclusive transmission units and some allocated to overlapping transmission units. An exclusive transmission unit includes one or more wireless time slot-frequency pairings assigned to a network node to send information without another assigned network transmission unit providing overlapping time slot-frequency interference from another network node communicating in the network. In contrast, an overlapping transmission unit includes one or more wireless time slot-frequency pairings assigned to the network node to send information, with the overlapping transmission unit overlapping in time slot-frequency with one or more other assigned network transmission units that will cause interference if simultaneously used.

Exclusive transmission units are more expensive than overlapping transmission units, because exclusive transmission units guarantee bandwidth to a sender, and the expense of precluding others from sending on an interfering time slot-frequency pairing. In one embodiment, exclusive transmission units are primarily used to constant bit rate traffic. One embodiment oversubscribes time-slot frequency pairings by assigning them to overlap in time slot-frequency such that all cannot be used during a single Superframe. In one embodiment before sending information using an overlapping transmission unit, a sending node listens to determine if a prior, overlapping transmission unit is being used that would interfere with its use of its overlapping transmission unit. If such interference is found, then the overlapping transmission unit will not be used during this Superframe; else, it will be used to communicate information with a receiver.

Figure 3A:
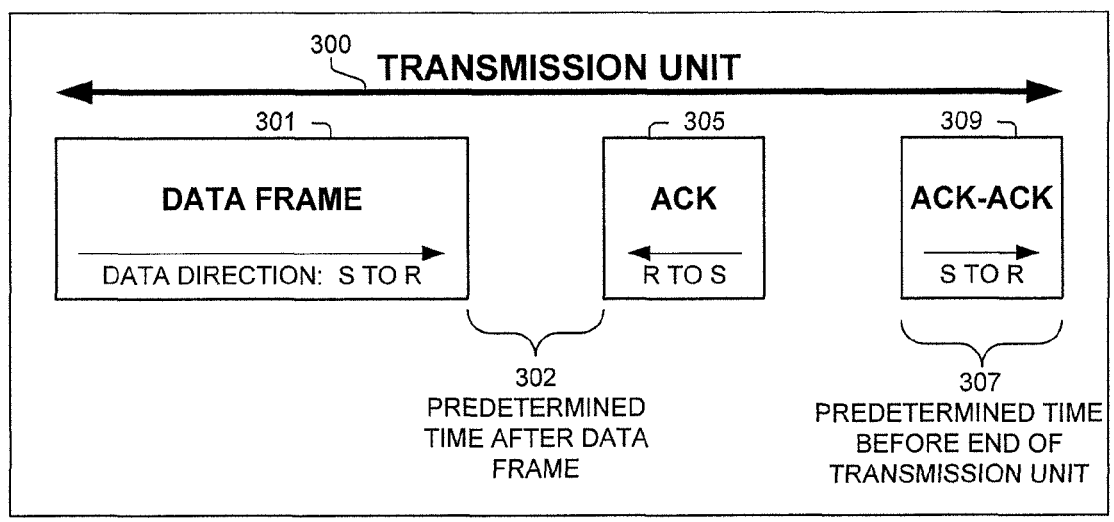
FIG. 3A illustrates a communication protocol used in one embodiment.

FIG. 3A illustrates a transmission unit 300 of one time slot or time-slot frequency pairing used in one embodiment. Transmission unit 300 is partitioned into three information sending times for transmission from a sender to a receiver of a data frame 301, transmission from the receiver to the sender of an acknowledgement (ACK) 305, and transmission from the sender to the receiver of an acknowledgement of the acknowledgement (ACK-ACK) 309. In one embodiment, the acknowledgement occurs at a determined time after the end (or expected end) of data frame 302. In one embodiment, the ACK-ACK occurs at a predetermined time before the end of transmission unit 300 (allowing for its deterministic sending time even if an ACK is not received).

Figure 3B:
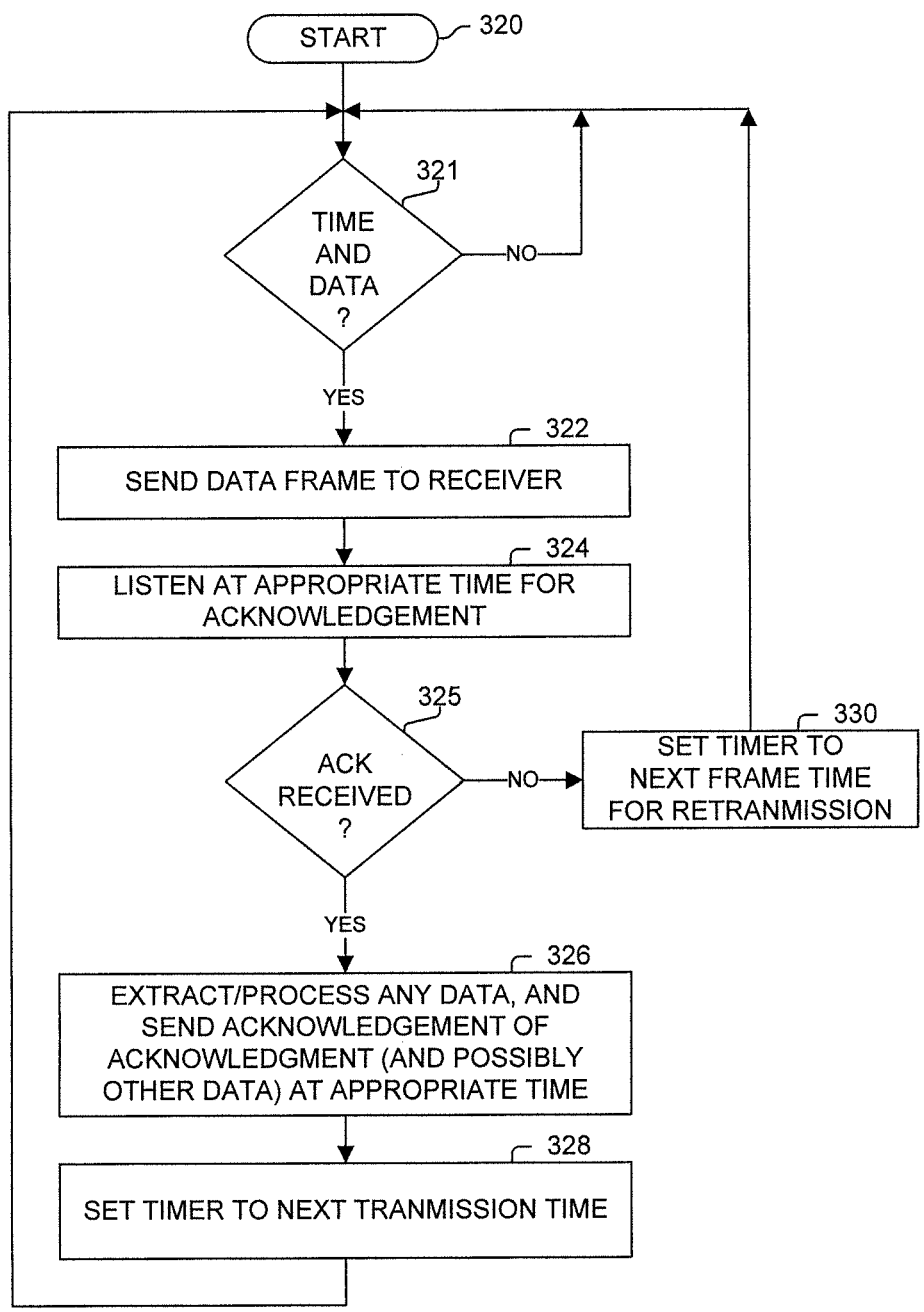
FIG. 3B illustrates a process according to one embodiment.
Figure 3C:
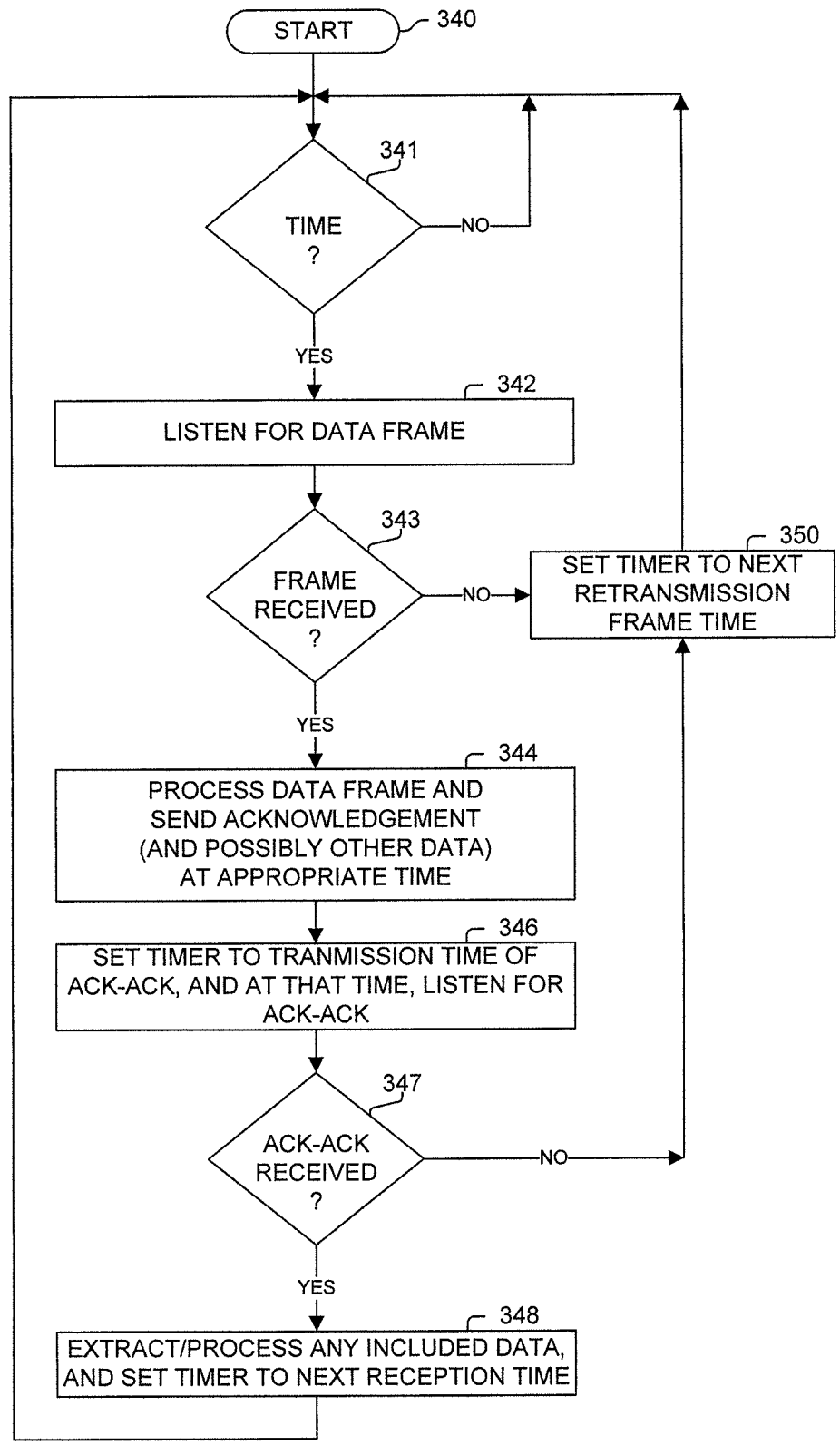
FIG. 3C illustrates a process according to one embodiment.

FIGS. 3B and 3C illustrate processing performed in one embodiment by a sender and receiver, respectively, communicating using a transmission unit 300 (FIG. 3A).

Processing of the flow diagram of FIG. 3B begins with process block 320. As determined in process block 321, when it is time to send data frame (301) and there is information (e.g., a packet to send), then in process block 322 the data frame is sent to the receive (using the corresponding frequency/channel in a wireless deterministic network). In process block 324, the sender listens at the appropriate time (after delay 302) for the acknowledgement 305. As determined in process block 325, if ACK 305 is received by the sender, then processing continues to process block 326; otherwise, processing proceeds to process block 330. In process block 330, a wake up timer is set for the next frame transmission time for retransmission of the information (e.g., within the same transmission unit having one or more retransmission time slot-frequency pairings, or a next transmission unit); and processing returns to process block 321. Otherwise, ACK (305) was received as determined in process block 325. Next, in process block 326, any data (e.g., control information) included in ACK 305 is extracted and processed, and the sender sends ACK-ACK 309 to the receiver at the appropriate time (307), possibly including additional data (e.g., control information). In process block 328, the wake up timer is set to the transmission time of the next transmission unit (no retransmission is required), and processing returns to process block 321.

Processing of the flow diagram of FIG. 3C begins with process block 340. As determined in process block 341, when it is time to listen for data frame 301 (FIG. 3A), this listening is performed in process block 324. If data frame 301 is not received as determined in process block 343, then in process block 350, a wake up timer is set to the next time to listen for a data frame. However, if data frame 301 is received as determined in process block 343, then in process block 344, the receiver processes the data frame and send ACK 305 to the sender at the appropriate time (302), possibly including other data (e.g., control information) in ACK 305. In process block 346, a wake up timer is set to the transmission time (307) of ACK-ACK 309, and receiver listens at that time. As determined in process block 347, if ACK-ACK 309 was not received, then processing proceeds to process block 350 (discussed supra); otherwise, ACK-ACK 309 was received and processing proceeds to process block 348. Therein, any data (e.g., control information) included in ACK-ACK 309 is extracted and processed, and a timer is set to the next reception time to listen for a frame 301. Processing returns to process block 341 to wait for the next time to listen for receiving a frame 301.

Figure 4A:
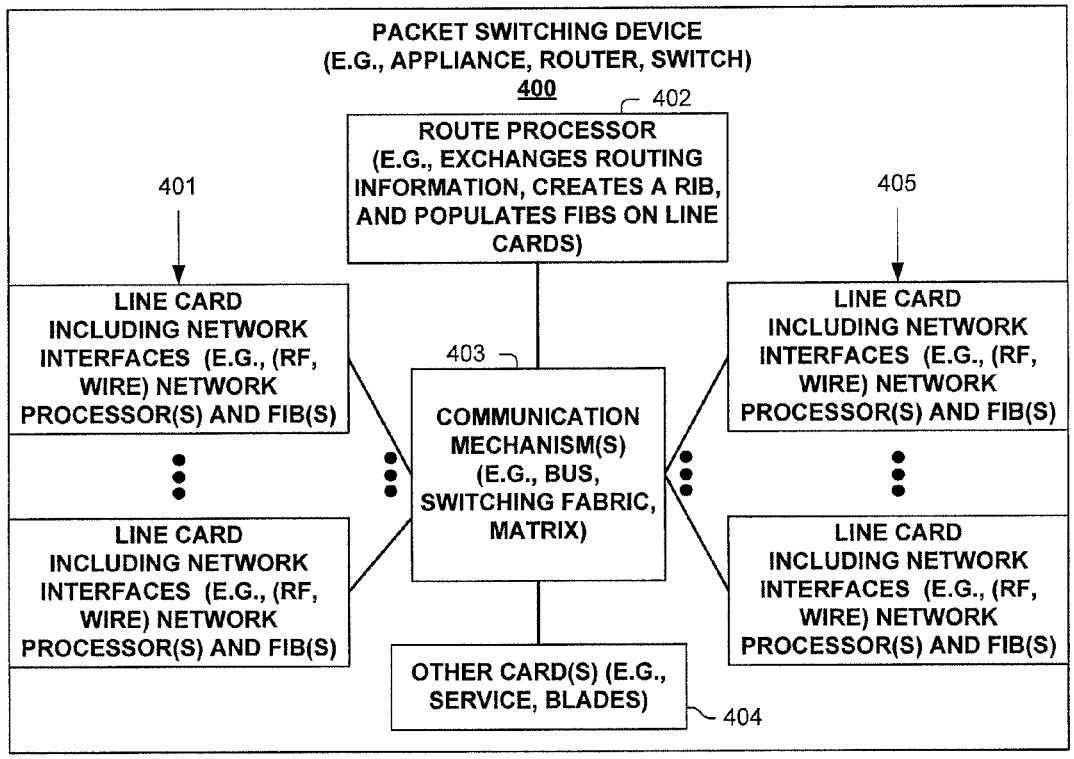
FIG. 4A illustrates a packet switching device according to one embodiment.

One embodiment of a packet switching device 400 (e.g., one example of a network node) is illustrated in FIG. 4A. As shown, packet switching device 400 includes multiple line cards 401 and 405, each with one or more network interfaces for sending and receiving packets over communications links, and with one or more processing elements that are used in one embodiment associated with exclusive and overlapping transmission unit allocation and use in a network, and/or reassignment of unused portions of a transmission unit in a network. Packet switching device 400 also has a control plane with one or more processing elements 402 for managing the control plane and/or control plane processing of packets associated with exclusive and overlapping transmission unit allocation and use in a network, and/or reassignment of unused portions of a transmission unit in a network. Packet switching device 400 also includes other cards 404 (e.g., service cards, blades) which include processing elements that are used in one embodiment to process packets associated with exclusive and overlapping transmission unit allocation and use in a network, and/or reassignment of unused portions of a transmission unit in a network, and some communication mechanism 403 (e.g., bus, switching fabric, matrix) for allowing its different entities 401, 402, 404 and 405 to communicate.

Figure 4B:
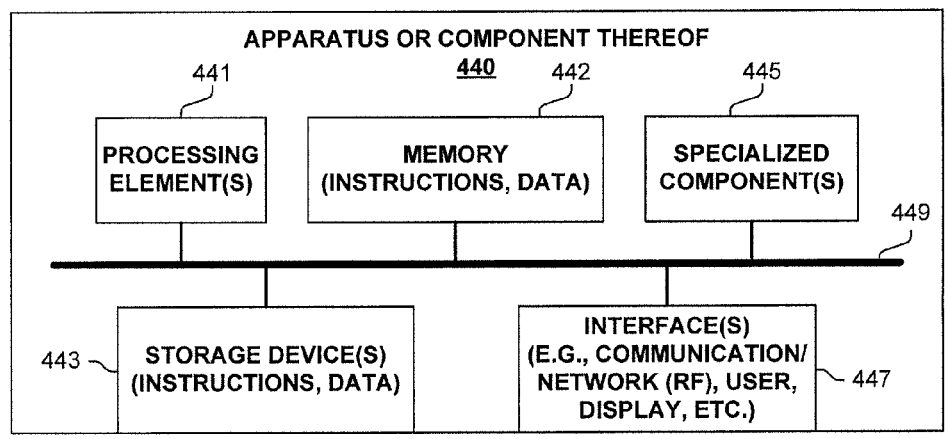
FIG. 4B illustrates an apparatus according to one embodiment.

FIG. 4B is a block diagram of an apparatus 420 (e.g., path definition agent, a node, or portion thereof) used in one embodiment associated with exclusive and overlapping transmission unit allocation and use in a network, and/or reassignment of unused portions of a transmission unit in a network. In one embodiment, apparatus 420 performs one or more processes, or portions thereof, corresponding to one of the flow diagrams illustrated or otherwise described herein, and/or illustrated in another diagram or otherwise described herein.

In one embodiment, apparatus 420 includes one or more processing element(s) 421, memory 422, storage device(s) 423, specialized component(s) 425 (e.g. optimized hardware such as for performing lookup and/or packet processing operations, etc.), and interface(s) 427 for communicating information (e.g., sending and receiving packets, user-interfaces, displaying information, etc.), which are typically communicatively coupled via one or more communications mechanisms 429, with the communications paths typically tailored to meet the needs of a particular application.

Various embodiments of apparatus 420 may include more or fewer elements. The operation of apparatus 420 is typically controlled by processing element(s) 421 using memory 422 and storage device(s) 423 to perform one or more tasks or processes. Memory 422 is one type of computer-readable/computer-storage medium, and typically comprises random access memory (RAM), read only memory (ROM), flash memory, integrated circuits, and/or other memory components. Memory 422 typically stores computer-executable instructions to be executed by processing element(s) 421 and/or data which is manipulated by processing element(s) 421 for implementing functionality in accordance with an embodiment. Storage device(s) 423 are another type of computer-readable medium, and typically comprise solid state storage media, disk drives, diskettes, networked services, tape drives, and other storage devices. Storage device(s) 423 typically store computer-executable instructions to be executed by processing element(s) 421 and/or data which is manipulated by processing element(s) 421 for implementing functionality in accordance with an embodiment.

Figure 5A:
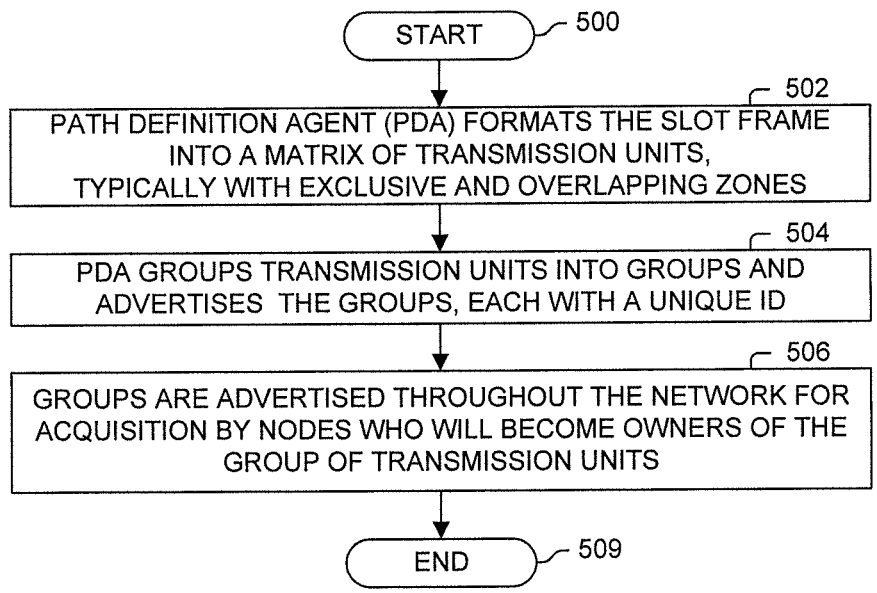
FIG. 5A illustrates a process according to one embodiment.

Processing of the flow diagram of FIG. 5A begins with process block 500. In process block 502, a more path determination agent (e.g., an orchestrator, path computation engine, network management system, other system) formats a slot frame (e.g., Superframe) into a matrix of transmission units, typically including exclusive and overlapping zones, such as, but not limited to, that illustrated and described in relation to FIGS. 2A-B. In process block 504, the path definition agent selectively groups these transmission into transmission unit groups, each with a unique identifier. In one embodiment, each transmission unit group is associated with a prime number and/or has a prime number of time slot-frequency pairings.

One embodiment defines these transmission unit groups as managing individual transmission units on a network-wide basis is not scalable, at least not to the extent of managing groups of multiple transmission units. These transmission unit groups along with their unique identifiers are advertised through the network. In one embodiment, some of these transmission unit groups are preallocated to certain network nodes. Processing of the flow diagram of FIG. 5A is complete as indicated by process block 509.

In one embodiment, transmission unit groups are claimed by nodes as they need them. Processing of the flow diagram of FIG. 5B beings with process block 520. As determined in process block 521, if a node receives a (spatial) advertisement of a node claiming ownership of a particular transmission unit group, then processing proceeds to process block 541. In one embodiment, this advertisement is spatial as only potentially interfering nodes will receive the advertisement, in contrast to all network nodes receiving the advertisement. As determined therein, if the advertisement is for a transmission unit group that the node currently owns, then in process block 524, the node sends a defend advertisement that this transmission unit group is not available for others to use. Otherwise if it is not owned by the node, then in process block 526, the node updates a data structure to mark that this transmission unit group is unavailable (it is still used whether or not another node sends a defend message). Processing proceeds to process block 531.

As determined in process block 531, if the node desires to acquire a transmission unit group, then in process block 532, the node selects an unused transmission unit group to acquire and (spatially) advertises its unique identifier to other network nodes and its ownership of the selected transmission unit group. As determined in process block 533, if a defend message is received from another node claiming current ownership of the selected transmission unit group, then the node marks in its data structure that it is not available and the node does not use it as indicated by process block 534. Otherwise, the node updates its data structure that it owns the selected transmission unit group and uses it for communication with one or more other nodes. Processing proceeds to process block 541.

As determined in process block 541, if the node determines to release a transmission unit group that it currently owns, then in process block 542, the node updates its data structure that this transmission unit group is no longer used, and (spatially) advertises to other network nodes that it is no longer owned by a node. Processing returns to process block 521.

Figure 5C:
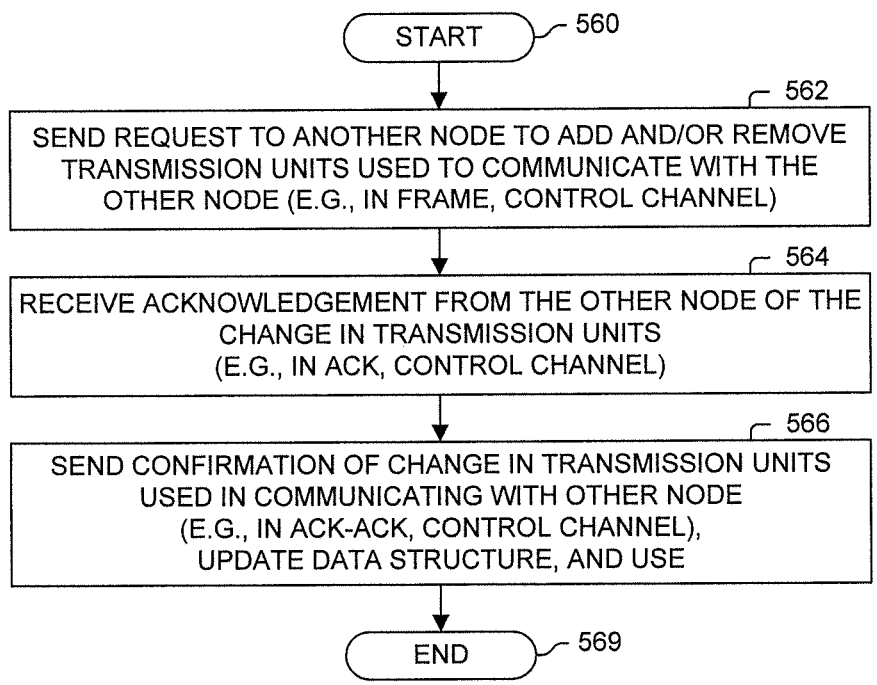
FIG. 5C illustrates a process according to one embodiment.
Figure 5B:
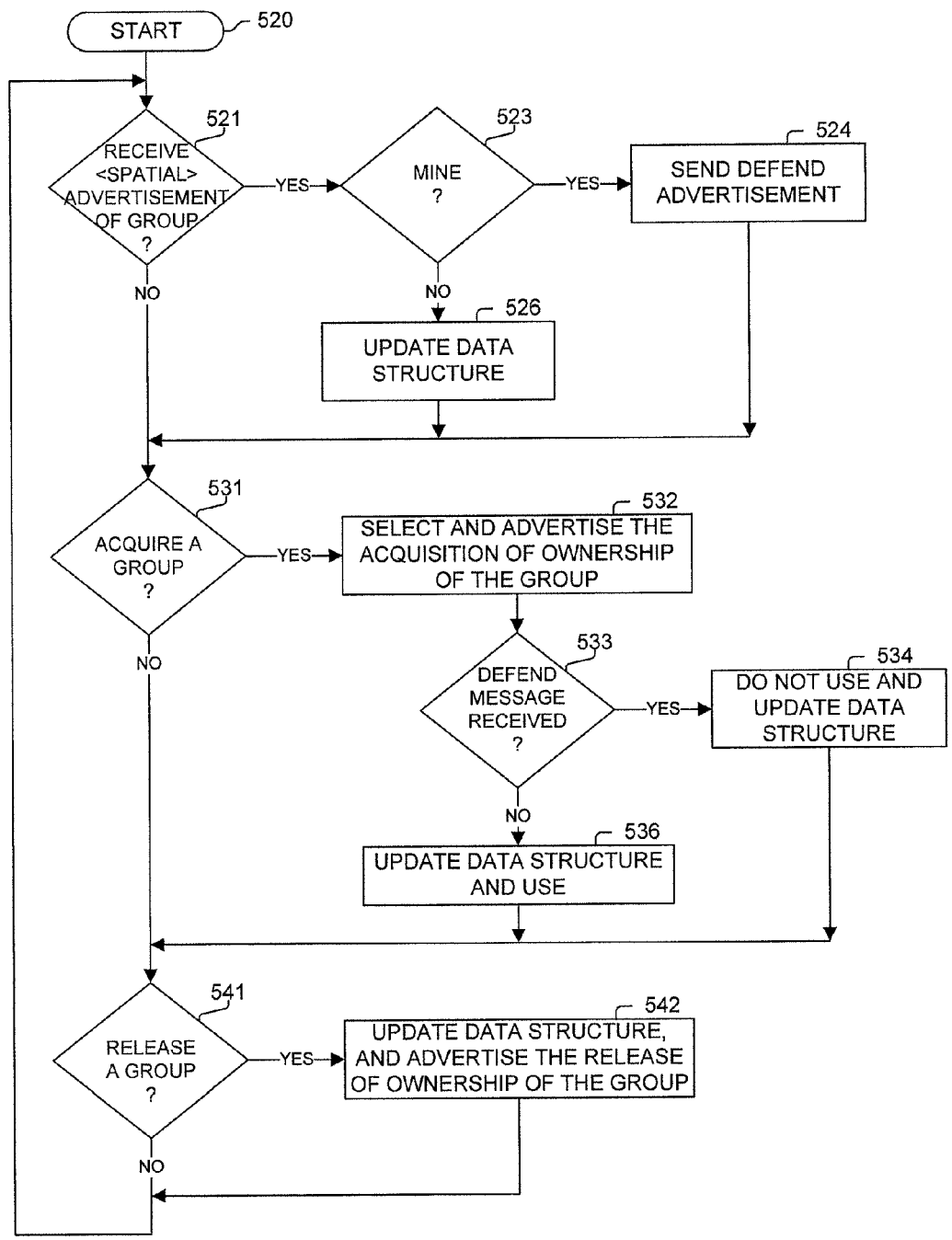
FIG. 5B illustrates a process according to one embodiment.

FIG. 5C illustrates a process performed in one embodiment by an owner of a transmission unit (e.g., of an owned group of transmission units) to request and change (e.g., add, remove) one or more transmission units of a selected type (e.g., exclusive, overlapping) for communicating with another network node. Processing begins with process block 560. In process block 562, the owner node sends a request to add or remove one or more transmission units, such as, but not limited to, in a control channel or in a data frame of an already established transmission unit. In process block 564, the owner receives a response from the other node acknowledging the change in one or more transmission units, such as, but not limited to, in a control channel or in an acknowledgment to the sent data frame. In process block 566, the owner sends a confirmation to the other node, such as, but not limited to, in a control channel or in an ACK-ACK to the acknowledgement. Processing of the flow diagram of FIG. 5C is complete as indicated by process block 569.

Figure 6A:
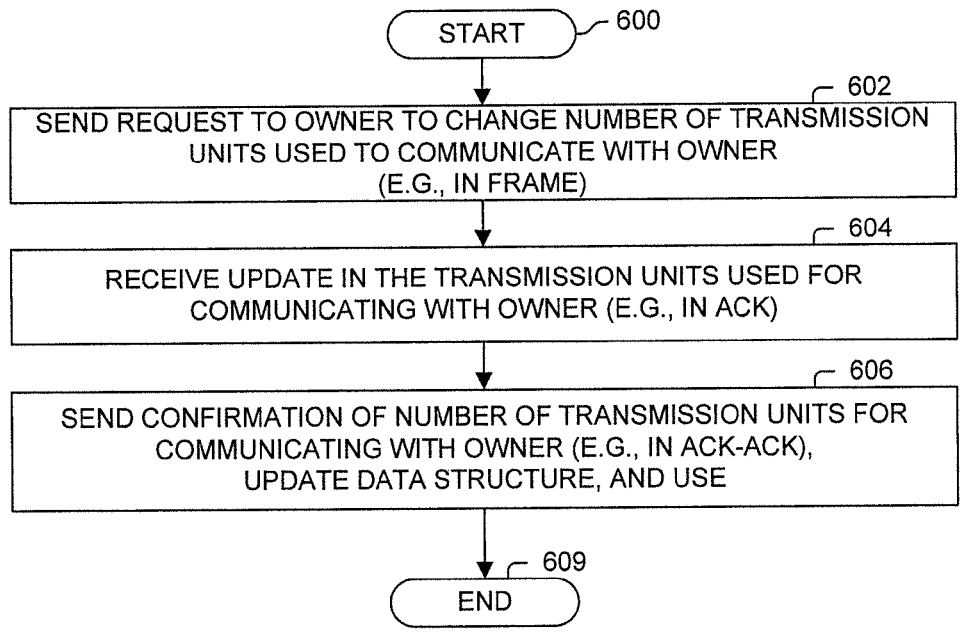
FIG. 6A illustrates a process according to one embodiment.

FIG. 6A illustrates processes performed in one embodiment for a slave (e.g., child) node requesting a change in the number and/or type (e.g., exclusive, overlapping) of transmission units used for communication from the slave to an owner (e.g., parent) during an already established transmission unit between the slave and the owner node. Processing of the flow diagram of FIG. 6A begins with process block 600. In process block 602, the slave node sends a request to change the number and/or type (e.g., overlapping, exclusive) of transmission units, such as, but not limited to, in a data frame 301 (FIG. 3A). In one embodiment, the slave node communicates to the owner and identification of transmission units already assigned to it (e.g., prime number product, bitmap, list, etc.). In process block 604, the slave node receives the update from the owner, such as, but not limited to, in the ACK 305. In process block 606, the slave node sends a confirmation to the owner, such as, but not limited to, in the ACK-ACK 309. The slave node also updates its data structure, and uses the assigned transmission data unit(s). Processing of the flow diagram of FIG. 6A is complete as indicated by process block 609.

Figure 6B:
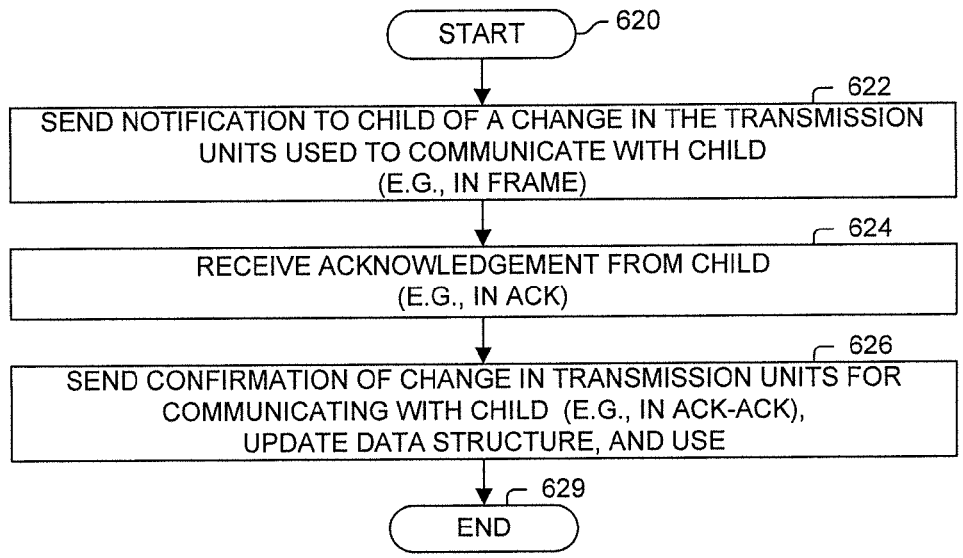
FIG. 6B illustrates a process according to one embodiment; and,
FIG. 7 illustrates a process according to one embodiment.

FIG. 6B illustrates processes performed in one embodiment by an owner (e.g., parent) node changing the number and/or type (e.g., exclusive, overlapping) of transmission units used for communication from the owner to an slave (e.g., child) node during an already established transmission unit between the owner and the slave node. Processing of the flow diagram of FIG. 6B begins with process block 620. In process block 622, the owner node sends a notification to change (increase, decrease) the number and/or type (e.g., exclusive, overlapping) of transmission units to the slave node, such as, but not limited to, in a data frame 301 (FIG. 3A). In process block 604, the owner node receives an acknowledgment of the change from the slave node, such as, but not limited to, in the ACK 305. In process block 606, the owner node sends a confirmation to the slave node, such as, but not limited to, in the ACK-ACK 309. The owner node also updates its data structure, and uses the assigned transmission data unit(s). Processing of the flow diagram of FIG. 6B is complete as indicated by process block 629.

Figure 7:
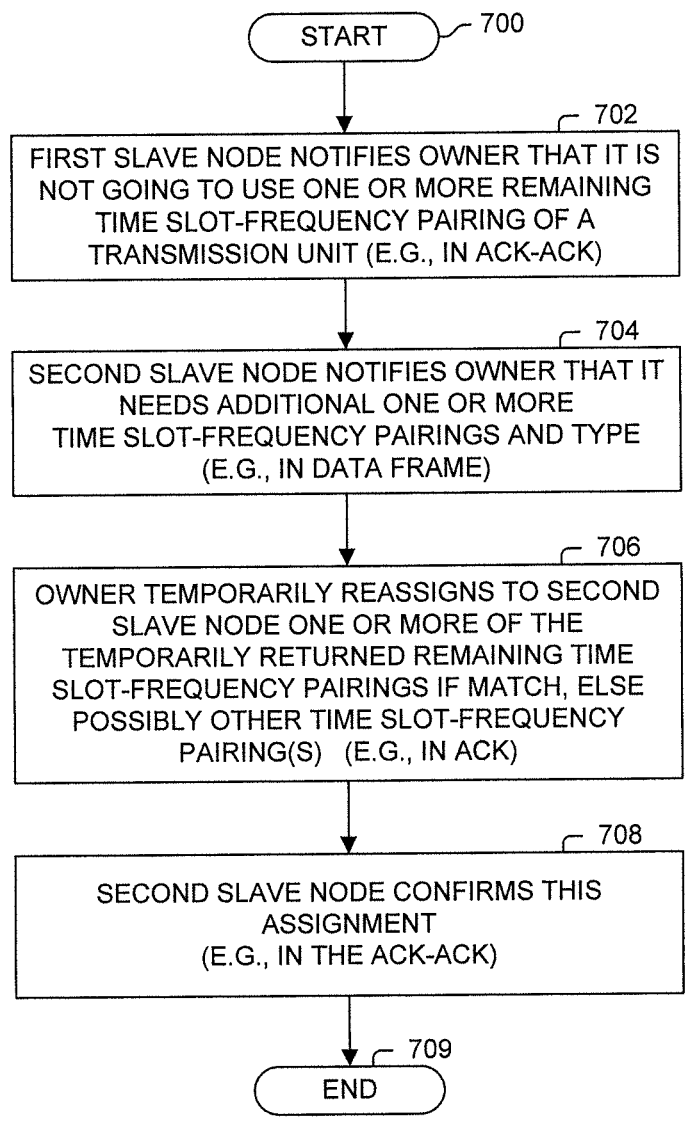

FIG. 7 illustrates a process performed in one embodiment to temporarily reassign unused portions of a transmission unit from a slave node (e.g., child) sending to an owner node (e.g., parent) to another slave node (e.g., for sending information to the parent node). Processing of the flow diagram of FIG. 7 begins with process block 700. In process block 702, a first slave node notifies the owner of a particular transmission unit that the first slave node is not going to use one or more time slot-frequency pairings of the particular transmission unit. In one embodiment, this information is communicated to the owner in an ACK-ACK 309 (FIG. 3A). In one embodiment, the first slave node determines it does not need these additional time slot-frequency pairings because it received an ACK 305 from the owner (so it does not need to retransmit).

In process block 704, a second slave node notifies the owner that it needs one or more additional time slot-frequency pairings and their type (e.g., exclusive, overlapping). In one embodiment, this request is communicated in a data frame 301 (so the owner can respond in the ACK 305). In one embodiment, the slave node needs these additional time slot-frequency pairings to communicate information to the owner node.

In process block 706, the owner temporarily reassigns to the second slave node one or more of the returned one or more time slot-frequency pairings. In one embodiment, this reassignment is communicated in an ACK 305. In one embodiment, if these pairings do not satisfy the requested one or more time slot-frequency pairings, then the owner node temporarily assigns one or more other time slot-frequency pairings, such as, but not limited to, from a pool of available owned time slot-frequency pairings, possibly monitoring time slot-frequency pairings not used by other children or other nodes in the vicinity.

In process block 708, the second slave node confirms that it will use these reassigned time slot-frequency pairings. In one embodiment, this confirmation is communicated in an ACK-ACK 309. The second slave node then uses these reassigned time slot-frequency pairings to communicate with another node, typically the owner node which configures itself to listen at the appropriate time and frequency (e.g., channel). Processing of the flow diagram of FIG. 7 is complete as indicated by process block 709.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
   sending information, from a first network node in a network, during an exclusive transmission unit, wherein the exclusive transmission unit includes one or more wireless time slot-frequency pairings assigned to the first network node to send information without another assigned network transmission unit providing overlapping time slot-frequency interference from another network node communicating in the network; and sending information, from the first network node, during an overlapping transmission unit, wherein the overlapping transmission unit includes one or more wireless time slot-frequency pairings assigned to the first network node to send information, with the overlapping transmission unit overlapping in time slot-frequency with one or more other assigned network transmission units that will cause interference if simultaneously used;

wherein the network is associated with a plurality of exclusive groups of exclusive transmission units, with each of the plurality of exclusive groups of exclusive transmission units including a plurality of different exclusive transmission units not included in another of the plurality of exclusive groups of exclusive transmission units, with a particular exclusive group of the plurality of exclusive groups including the exclusive transmission unit; and wherein the network is associated with a plurality of overlapping groups of overlapping transmission units, with each of the plurality of overlapping groups of overlapping transmission units including a plurality of different overlapping transmission units not included in another of the plurality of overlapping groups of overlapping transmission units, with a particular overlapping group of the plurality of exclusive groups including the overlapping transmission unit.

2. The method of claim 1, comprising: acquiring, by the first network node, ownership of the particular exclusive group and the particular overlapping group.

3. The method of claim 2, wherein the first network node is a child of a parent network node in the network; and wherein the first network node acquires the assignment of the particular exclusive group and the particular overlapping group from the parent network node.

4. The method of claim 3, wherein the plurality of exclusive groups and the plurality of overlapping groups are initially defined by one or more path definition agents.

5. The method of claim 3, comprising: communicating, by the first network node to the parent network node, one or more request messages requesting an assignment of one or more exclusive transmission units and one or more overlapping transmission units; and wherein said acquisition of the assignment of the particular exclusive group and the particular overlapping group from the parent network node is in response to at least one of said one or more request messages.

6. The method of claim 3, comprising network publishing, by the parent network node, ownership of the exclusive transmission unit and the overlapping transmission unit.

7. The method of claim 2, wherein the first network node acquires the assignment of the particular exclusive group and the particular overlapping group from one or more path definition agents associated with the network.

8. The method of claim 2, comprising network publishing, by the first node, ownership of the exclusive transmission unit and the overlapping transmission unit.

9. The method of claim 1, comprising acquiring, by the first network node, ownership of the exclusive transmission unit and the overlapping transmission unit from a parent network node or a path definition agent.

10. A method, comprising:
communicating, by a first network node to a parent network node in a network with the first network node being a child of the parent node in the network, a request message requesting an assignment of one or more exclusive transmission units;

acquiring, by the first network node from the parent network node in response to the request message, assignment of a particular exclusive group of a plurality of different exclusive groups, with each of the plurality of exclusive groups including a plurality of different exclusive transmission units not included in another of the plurality of exclusive groups, and with the particular exclusive group including a particular exclusive transmission unit, wherein an exclusive transmission unit being defined to include one or more wireless time slot-frequency pairings for communicating information without another network transmission unit defined during an overlapping time slot-frequency that could provide interference; and sending information, from the first network node, during the particular exclusive transmission unit; and wherein the particular exclusive transmission unit comprises a particular time slot-frequency pairing including a frame time for sending from the first network node to the parent network node a data frame, an acknowledgement time for sending from the parent network node to the first network node an ACK message acknowledging successful receipt of the data frame, and an acknowledgment of the acknowledgment time for sending from the first network node to the parent network node an ACK-ACK message acknowledging successful receipt of the ACK message; and wherein the frame time includes the request message, the acknowledgement time includes the assignment of the particular exclusive group to the first network node, and the acknowledgment of the acknowledgment time includes a confirmation that the first network node has acquired the particular exclusive transmission unit.

11. The method of claim 10, comprising network publishing, by the first network node, assignment of the particular exclusive group to the first network node.

12. The method of claim 11, wherein the first network node is a parent network node of a plurality of child nodes in the network.

13. The method of claim 10, comprising: network publishing, by the parent network node, assignment of the particular exclusive group to the parent network node.

14. A method, comprising:
acquiring, by a first network node in a network, assignment a particular exclusive group of a plurality of different exclusive groups, with each of the plurality of exclusive groups including a plurality of different exclusive transmission units not included in another of the plurality of exclusive groups, and with the particular exclusive group including a particular exclusive transmission unit, wherein an exclusive transmission unit being defined to include one or more wireless time slot-frequency pairings for communicating information without another network transmission unit defined during an overlapping time slot-frequency that could provide interference; and sending information, from the first network node, during the particular exclusive transmission unit;

wherein the first network node is a child of a parent network node in the network; and wherein the first network node acquires said assignment of the particular exclusive group from the parent network node; and wherein each of the plurality of plurality of different exclusive groups is associated with a different prime number; wherein the first node, prior to said acquiring assignment of the a particular exclusive group, acquired a currently used plurality of the plurality of different exclusive groups not including the particular exclusive group.

15. The method of claim 14, wherein said acquiring of said assignment of the particular exclusive group includes sending a confirmation by the first network node to the parent network node, with said confirmation including a product of the prime numbers associated with each of the currently used plurality of the plurality of different exclusive groups and the particular exclusive group.

16. The method of claim 14, comprising: communicating, by the first network node to the parent network node, a request message requesting an assignment of one or more exclusive transmission units; and wherein said acquisition of the assignment of the particular exclusive group is in response to the request message.

17. The method of claim 16, wherein the particular exclusive transmission unit comprises a particular time slot-frequency pairing including a frame time for sending from the first network node to the parent network node a data frame, an acknowledgement time for sending from the parent network node to the first network node an ACK message acknowledging successful receipt of the data frame, and an acknowledgment of the acknowledgment time for sending from the first network node to the parent network node an ACK-ACK message acknowledging successful receipt of the ACK message; and wherein the frame time includes the request message, the acknowledgement time includes the assignment of the particular exclusive group to the first network node, and the acknowledgment of the acknowledgment time includes a confirmation that the first network node has acquired the particular exclusive transmission unit.

18. A method, comprising:
acquiring, by a first network node in a network, assignment of a particular overlapping group of a plurality of different overlapping groups, with each of the plurality of overlapping groups including a plurality of different overlapping transmission units not included in another of the plurality of overlapping groups, and with the particular overlapping group including a particular overlapping transmission unit, wherein an overlapping transmission unit being defined to include one or more wireless time slot-frequency pairings for communicating information with another network transmission unit defined during an overlapping time slot-frequency that will provide interference if simultaneously used; and
sending information, from the first network node, during the particular overlapping transmission unit;
wherein the first network node is a child of a parent network node in the network; and wherein the first network node acquires said assignment of the particular overlapping group from the parent network node; and wherein the method includes: communicating, by the first network node to the parent network node, a request message requesting an assignment of one or more overlapping transmission units; and wherein said acquisition of the assignment of the particular overlapping group is in response to the request message; and
wherein the particular overlapping transmission unit comprises a particular time slot-frequency pairing including a frame time for sending from the first network node to the parent network node a data frame, an acknowledgement time for sending from the parent network node to the first network node an ACK message acknowledging successful receipt of the data frame, and an acknowledgment of the acknowledgment time for sending from the first network node to the parent network node an ACK-ACK message acknowledging successful receipt of the ACK message; and wherein the frame time includes the request message, the acknowledgement time includes the assignment of the particular overlapping group to the first network node, and the acknowledgment of the acknowledgment time includes a confirmation that the first network node has acquired the particular overlapping transmission unit.

* * * * *

UNITED STATES PATENT AND TRADEMARK OFFICE
CERTIFICATE OF CORRECTION

| | | |
|---|---|---|
| PATENT NO. | : 9,258,098 B2 | Page 1 of 1 |
| APPLICATION NO. | : 13/954725 | |
| DATED | : February 9, 2016 | |
| INVENTOR(S) | : Thubert et al. | |

It is certified that error appears in the above-identified patent and that said Letters Patent is hereby corrected as shown below:

On the Title Page of Patent

(57) ABSTRACT, line 7, "info nation" should be -- information --

Signed and Sealed this
Third Day of May, 2016

Michelle K. Lee
*Director of the United States Patent and Trademark Office*